(12) United States Patent
Barrett

(10) Patent No.: US 6,873,644 B1
(45) Date of Patent: Mar. 29, 2005

(54) HIGH DATA RATE INTER-SATELLITE COMMUNICATIONS LINKS METHOD

(76) Inventor: Terence W. Barrett, 1453 Beulah Rd., Vienna, VA (US) 22182

( * ) Notice: Subject to any disclaimer, the term of this patent is extended or adjusted under 35 U.S.C. 154(b) by 785 days.

(21) Appl. No.: 09/672,707

(22) Filed: Sep. 29, 2000

Related U.S. Application Data
(60) Provisional application No. 60/158,162, filed on Oct. 8, 1999.

(51) Int. Cl.[7] .............................................. H04B 1/69
(52) U.S. Cl. ....................................................... 375/138
(58) Field of Search ................................. 375/138, 211, 375/214, 130, 140, 146; 455/21.1, 98, 427; 370/316, 320, 324, 335, 342, 441, 321; 342/316

(56) References Cited

U.S. PATENT DOCUMENTS

| | | | | |
|---|---|---|---|---|
| 4,188,578 A | * | 2/1980 | Reudink et al. ............ | 370/323 |
| 5,610,907 A | | 3/1997 | Barrett ....................... | 370/342 |
| 6,160,802 A | * | 12/2000 | Barrett ....................... | 370/342 |
| 6,345,066 B1 | * | 2/2002 | Haartsen ..................... | 375/130 |
| 6,381,053 B1 | * | 4/2002 | Fathallah et al. ............. | 398/99 |
| 6,560,450 B1 | * | 5/2003 | Rosenberg et al. ......... | 455/316 |
| 6,636,567 B1 | * | 10/2003 | Roberts et al. ............. | 375/247 |

OTHER PUBLICATIONS

Yang et al., "Block–Spreading Codes for Impulse Radio Mulrtiple Access though ISI," IEEE 2002, pp 807811.*
Yang et al., "Multistage Block–Spreading for Impulse Radio Multiple Access Through ISI channels,"IEEE Journal on Selected area in communication vol. 20, No. 9, Dec. 2002, pp 1767–1777.*

Barrett, T.W., The information content of an electromagnetic field with relevance to sensory processing of information. *T.I.T. J. Life Sciences*, 1, 129–135, 1971.
Barrett, T.W., On vibrating strings and information theory.*J. Sound & Vibration*, 20, 407–412, 1972.
Barrett, T.W., Conservation of Information, *Acustica*. 27, 44–47, 1972.
Barrett, T.W., Definition precedence of signal parameters: sequential versus simultaneous information. *Acustica*, 27, 90–93, 1972.
Barrett, T.W., The conceptual basis for two information theories—a reply to some criticisms. *J. Sound & Vibration*, 25, 638–642, 1972.
Barrett. T.W., Analytical information theory. *Acustica*, 29, 65–67, 1973.
Barrett, T.W., Structural information theory. *J. Acoust. Soc. Am.*, 54, 1092–1098, 1973.

(Continued)

Primary Examiner—Tesfaldet Bocure
(74) Attorney, Agent, or Firm—Jim Zegeer

(57) ABSTRACT

High data rate inter-satellite communications links method for a plurality of satellites comprising providing, for each satellite, an ultrafast time hopping wireless satellite communications link of an allowed bandwidth in which data is transmitted using individual packets or pulses in a sequence of such packets or pulses, causing the individual packets or pulses to be short in duration so that the individual packets are pulsed and signal energy is spread over the allowed bandwidth substantially simultaneously and instantaneously. A time hopping sequential code is used to position the packets or pulses precisely in sequence thereby providing optimum use of frequency space and also providing noninterfering transmission channels due to the orthogonality of the coding scheme used.

4 Claims, 8 Drawing Sheets

OTHER PUBLICATIONS

Barrett, T.W., Structural information theory based on electronic configurations. *T.I.T. J. Life Sciences,* 5, 29–42, 1975.

Barrett, T.W., Nonlinear analysis and structural information theory: a comparison of mathematical and physical derivations. *Acustica,* 33, 149–165, 1975.

Barrett, T.W., On linearizing nonlinear systems. *J. Sound & Vibration,* 39, 265–268, 1975.

Barrett, T.W., Linearity in secular systems: four parameter superposition. *J. Sound & Vibration,* 41, 259–261, 1975.

Barrett, T.W., Information measurement I. On maximum entropy conditions applied to elementary signals. *Acustica,* 35, 80–85, 1976.

Barrett, T.W., Information measurement II. On minimum conditions of energy order applied to elementary signals. *Acustica,* 36, 282–286, 1976.

Barrett, T.W., Structural information theory of sound. *Acustica,* 36, 272–281, 1976.

Barrett, T.W., Quantum statistical foundations for structural information theory and communication theory. pp. 391–409 in V.Lakshmikantham (ed) *Nonlinear Systems & Applications: An International Conference,* Academic Press, New York , 1977.

Blahut, R.E., *Principlesand Practice of Information Theory,* Addison–Weslet, MA, 1987. (Reference is made to the book for further background information.) Cover and title page attached.

Haykin, S., *Communication Systems,* 3rd Edition, John Wiley, New York, 1994.

Saadawi, T.N. & Ammar, M.H., *Fundamentals of Telecommunication Networks,* John Wiley, New York, 1994.

Schwartz, M., *Telecommunication Networks: Protocols, Modeling and Analysis,* Addison–Wesley, Reading, MA, 1987.

\* cited by examiner

A. TDMA

B. CDMA

6A.

6B.

HIGH DATA RATE INTER-SATELLITE COMMUNICATIONS LINKS METHOD

REFERENCE TO RELATED APPLICATION

This application is the subject of provisional application Ser. No. 60/158,162 filed Oct. 8, 1999 entitled HIGH DATA RATE INTER-SATELLITE COMMUNICATIONS LINKS.

BACKGROUND OF THE INVENTION

The present invention relates generally to high data rate inter-satellite communications links—whether transmitting at light or infrared or millimeter wave or microwave or RF energies—where it is desirable to provide communications between satellites at the highest data rate and to relay terrestrially at the highest data rate commensurate with bandwidth restrictions and reliable communications, and more particularly to satellite systems defined in the time-frequency domain which transmit very short pulses or wave packets with a carrier but of a small number of cycles. (For representative pulse and packet signals, see FIGS. 1 and 2 and Barrett (1971–7) (See "References" List attached hereto). For time hopping coding schemes, see Barrett U.S. Pat. No. 5,610,907, incorporated herein by reference.

In many instances, communications between a group of satellites and ground stations is required which is of high data rate but (a) which requires a single transmitter-satellite of two or more messages, only one of which is received by two or more receiver-satellites or ground stations, or (b) which requires two or more transmitter-satellites of two or more messages, only one of which is received by two or more receiver-satellites or ground stations.

In other instances, a satellite is capable of providing extremely high data rate channels to a terrestrial downlink node, but the node is capable of relaying but a fraction of the data rate of the down channels. This is known in the industry as the "last mile" problem. The present invention provides a solution to that problem by providing bandwidth efficient use of the FCC permitted spectrum available to the user. Given a permitted possible time-bandwidth product available to the terrestrial node, there is a well known Shannon limit to the channel capacity of that node. Typically, that limit is not closely approached. The present invention permits a closer approach to the theoretic Shannon limit.

The Shannon limit is defined with respect to the Shannon channel capacity, C, in bits per second.

$$C = B \log_2 \left[ 1 + \left( \frac{S}{N} \right) \right], \text{ or}$$

$$C = B \log_2 \left[ 1 + \left( \frac{E_b}{N_0} \right) \left( \frac{R}{B} \right) \right],$$

where B is signal bandwidth, $S = E_b R$ is the signal input power constraint, $N = N_0 B$ is the channel noise variance, $E_b$ is the energy per bit, $N_0$ is the spectral noise and R is the information rate (in its per second). The following inequality is a necessary consequence:

$$\frac{R}{B} < \frac{C}{B}.$$

If the spectral bit rate, r, is defined:

$$r = \frac{R}{B},$$

then $$r < \log_2 \left[ 1 + r \frac{E_b}{N_0} \right] \text{ or}$$

$$\frac{E_b}{N_0} > \frac{2^r - 1}{r}.$$

The inequality is shown in FIG. 3. All digital communications systems can be described at locations lying below the curve in FIG. 3. Above the curve, reliable communications are not possible.

The present invention addresses signal pulses or packets arranged in a time hopping code (see Barrett U.S. Pat. No. 5,610,907 (1997)). A Gaussian approximation can be used to evaluate the probability of error for time hopping codes. The bit error rate (BER) is described by:

$$BER = \frac{1}{2} \text{erfc} \left( \frac{Q}{\sqrt{2}} \right) \approx \frac{\exp(-Q^2/2)}{Q\sqrt{2\pi}},$$

where $$Q = \sqrt{SNR}/2.$$

In terms of the signal-to-noise (SNR) ratio this is:

$$SNR = 4Q^2 = \frac{P^2}{VAR(K-1)}, \text{ or}$$

$$Q = \frac{P}{2\sqrt{VAR(K-1)}},$$

where VAR is the variance of the cross-correction amplitude, i.E., The variance of the amplitude of the interference, P is signal power level and K are the number of satellite nodes in a network. In other words, the SNR ratio is the ratio of the autocorrelation peak squared to the variance of the amplitude of the interference. Thus, the SNR is directly proportional to the number of chips per code sequence. Introducing the data rate, R, as a trade variable, the relations become:

$$SNR = \frac{P^2}{R \times VAR(1-K)},$$

$$Q = \frac{P}{2\sqrt{R \times VAR(K-1)}}.$$

FIG. 4 shows the variation of the BER as a function of the Q parameter.

FIGS. 3 and 4 show the well known trades: Given a constant permitted signal bandwidth, B, a constant bit error rate, BE, can be obtained in the presence of noise or interference by (1) increasing the signal-to-noise (SNR) level, or (2) by decreasing the data rate, R, and thereby decreasing the spectral efficiency, r. If the requirement is a constant data rate, R, and if interference reduces the signal-to-noise (SNR) level, signal bandwidth, B, must be increased reducing the spectral bit rate, r, to the limit of zero at the bound:

$$\frac{E_b}{N_0} \approx SNR \geq \log_e 2 = 0.69 \approx -1.6 \text{ dB}.$$

This ia a fundamental limit and the ratio of energy per bit to spectral noise cannot be less than 0.69 to achieve reliable communication in the presence of Gaussian noise. Reliable communication systems only exist for system ratios greater than 0.69.

OBJECT OF THE INVENTION

It is also a consequence of the Shannon bounds that given constraints on the parameters of signal bandwidth, BW, signal-to-noise, SNR, and bit error rate, BER, the data rate, R, can be maximized by increasing the spectral efficiency, r. It is well known that most communications systems do not transmit near the Shannon bounds and are thus inefficient users of the spectrum available.

It is an object of the present invention to achieve the highest data rates, R, possible given constraints on signal bandwidth, BW, signal-to-noise, SNR, and bit error rate, BER, by maximizing spectral efficiency, r.

It is a further object of the present invention to maximize the spectral efficiency by the use of short pulse or packet signals arranged in time hopping codes.

It is a further object of the present invention to utilize such codes to achieve both time-division-multiple-access (TDMA) and code-division-multiple-access (CDMA).

It is a further object of the present invention to achieve reliable communication by trading data rate, R, for signal averaging.

SUMMARY OF THE INVENTION

Briefly, the above and other objects of the present invention are achieved in an ultrafast time hopping wireless satellite communications system—which can transmit at light or infrared or millimeter wave or microwave or RF energies—which uses individual packets or pulses in a sequence of such packets or pulses—such packets or pulses described in Barrett (1971–77)—those individual packets or pulses being so short in duration, that the individual packet or pulse signal energy is spread over the allowed bandwidth simultaneously or instantaneously (instead of sequentially). A time hopping sequential code is also used to position these packets or pulses precisely in sequence providing optimum use of time-frequency space and also providing noninterfering transmission channels due to the orthogonality of the coding schemes used. These coding schemes are described in Barrett U.S. Pat. No. 5,610,907 (1997).

The ultrashort nature of the individual packets or pulses used also permits the time duration of a frame to be divided into very many microintervals of time in which the signal could occur. This division into very many microintervals in a frame permits the availability of many possible coding schemes as well as many noninterfering transmission channels. Thus, the ultrashort nature of the individual packets or pulses, together with orthogonal coding schemes, permits the highest multichannel data rates of any wireless communications system.

In one embodiment of the present invention, a communications system uses: (i) orthogonal codes which can be slaved to a single receiver/matched filter and which captures and assigns each code to unique decoders; (ii) correlators/acquisition systems/matched filters which are able to detect the ultrafast signals and retain memory of such capture over superframes; (iii) power sources, antennas, encoders, oscillator-clocks, intelligence/data encrypters; and (iv) ASICs to provide coding information to both encoders and decoders.

DETAILED DESCRIPTION OF THE PREFERRED EMBODIMENT

Figure 1:
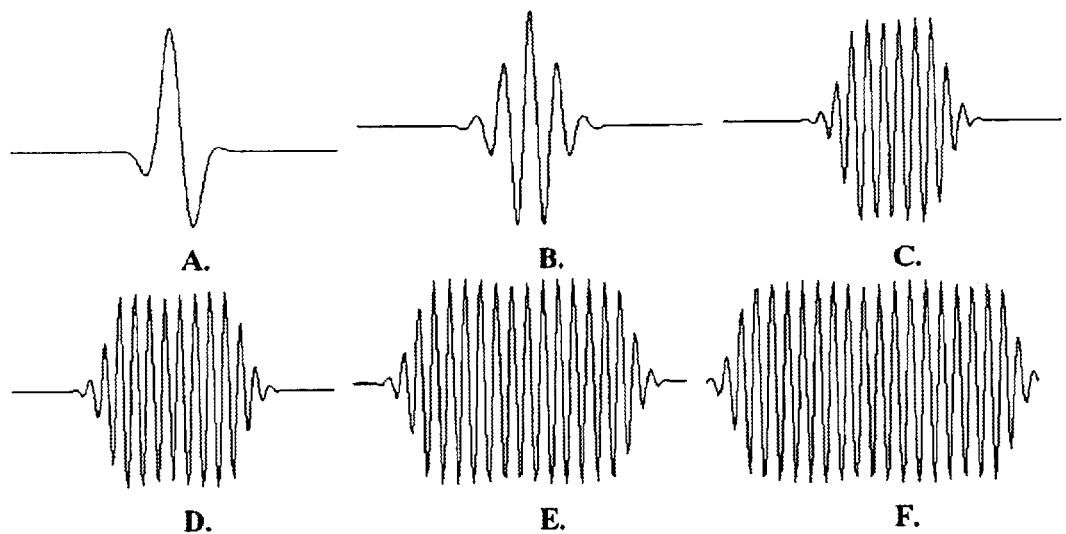
FIGS. 1A–E are representative pulse and packet signals.
Figure 2:
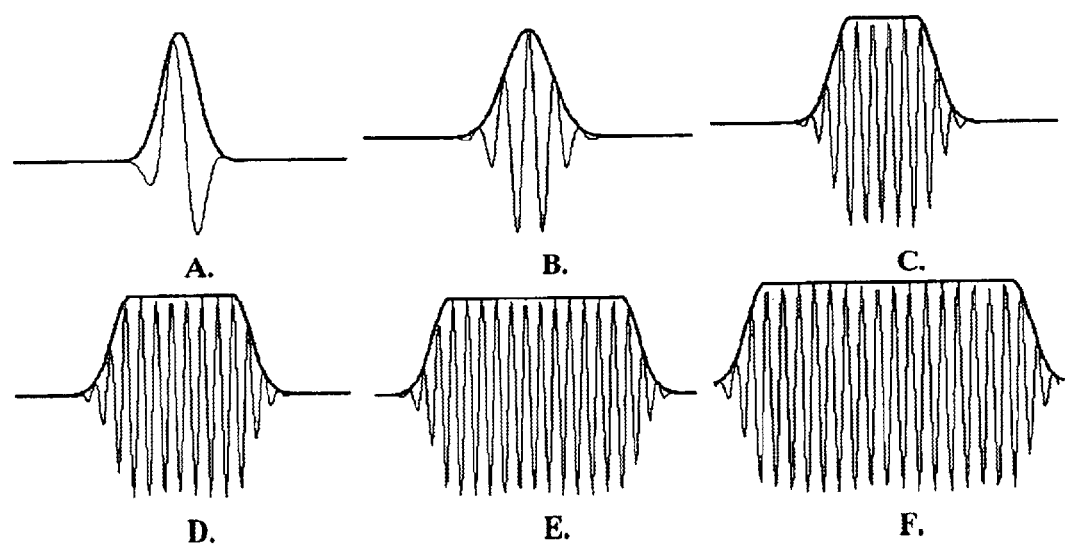
FIGS. 2A–E are representative pulse and packet signals with envelopes indicated by thicker lines.
Figure 3:
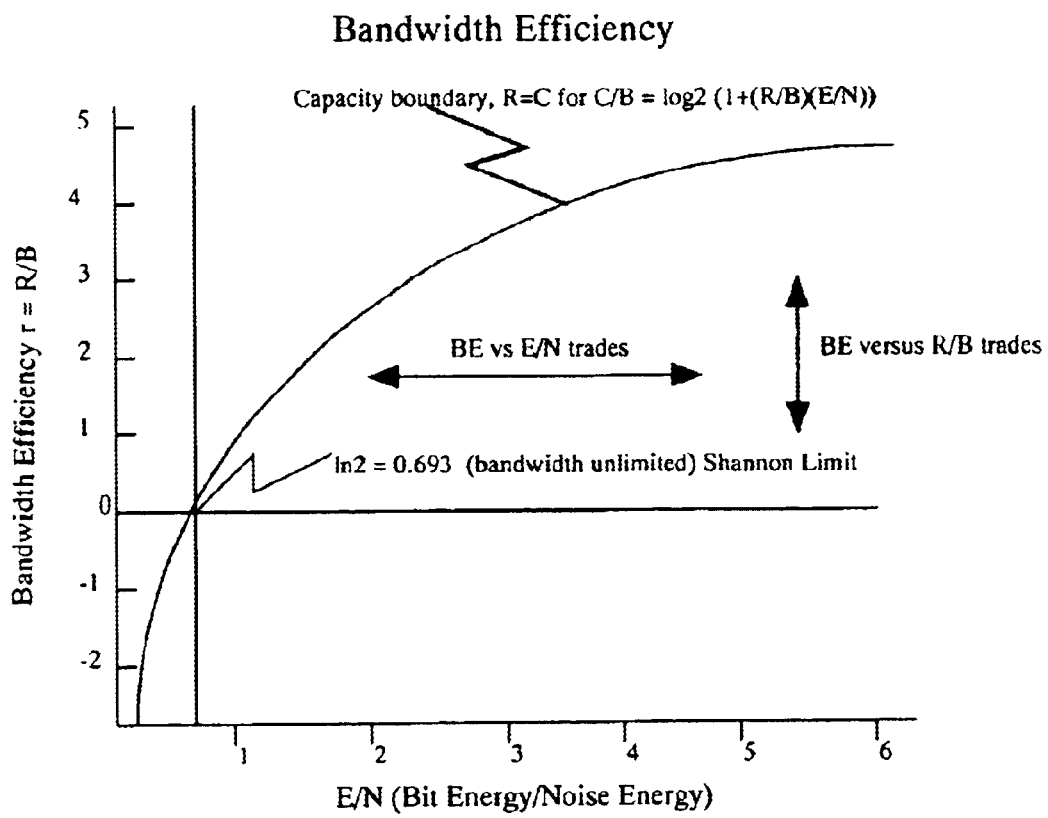
FIG. 3 illustrates bandwidth efficiency defined with respect to the Shannon Limit and Capacity Boundary.
Figure 4:
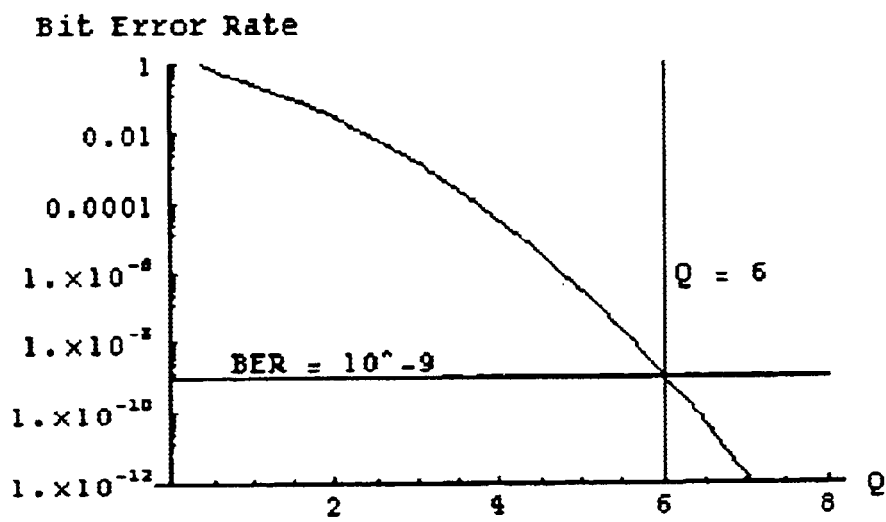
FIG. 4 illustrates bit-error rate versus the Q parameter. Line at BE=$10^{-9}$ intersects curve at Q=6.

In general physical terms, the present invention is a system described in FIG. 3. The various component parts are described in the System section and the specifics of the coding schemes are described in U.S. Pat. No. 5,610,907.

The Satellite System

Figure 5:
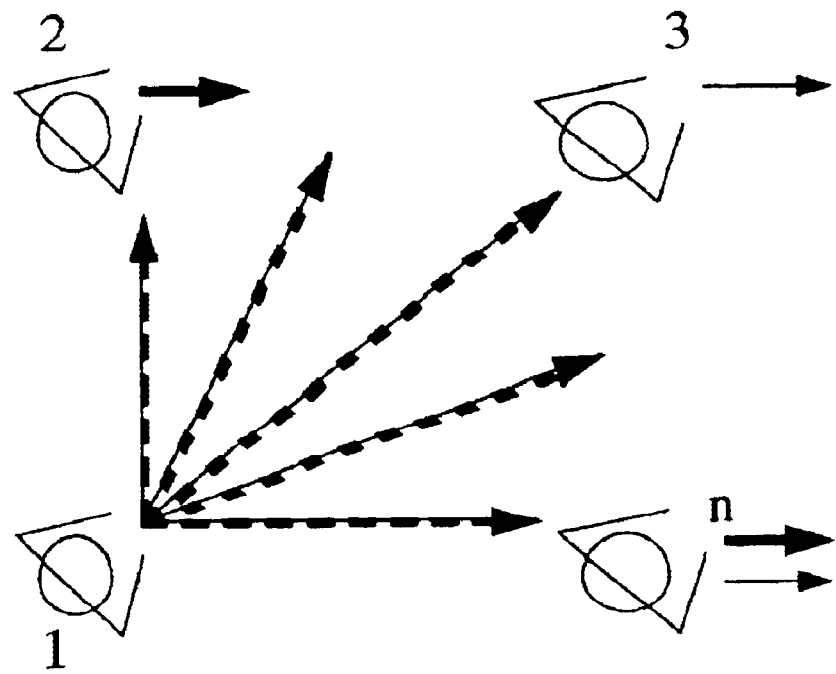
FIGS. 5A and B. Representative communications network of satellite systems.
Figure 5:
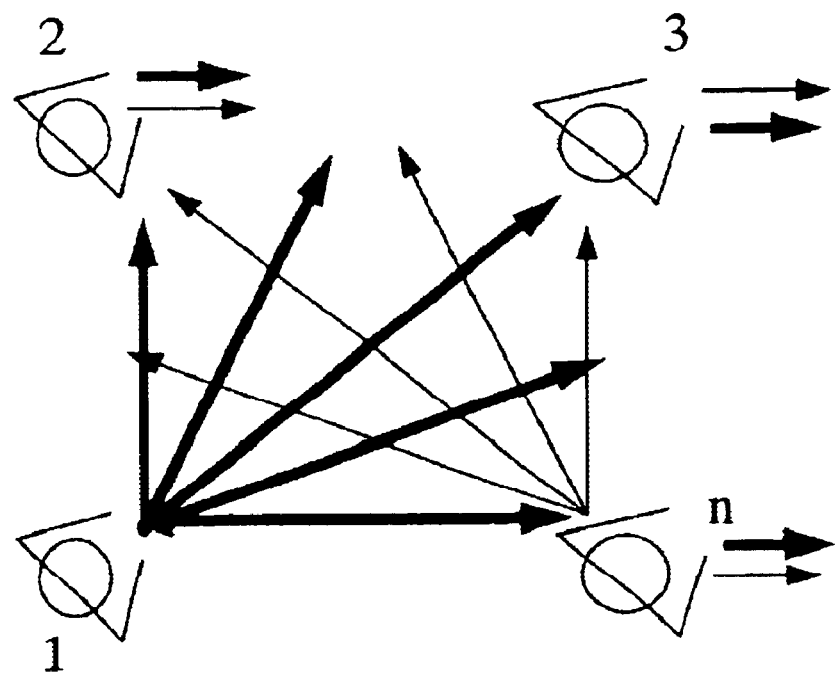
Figure 6:
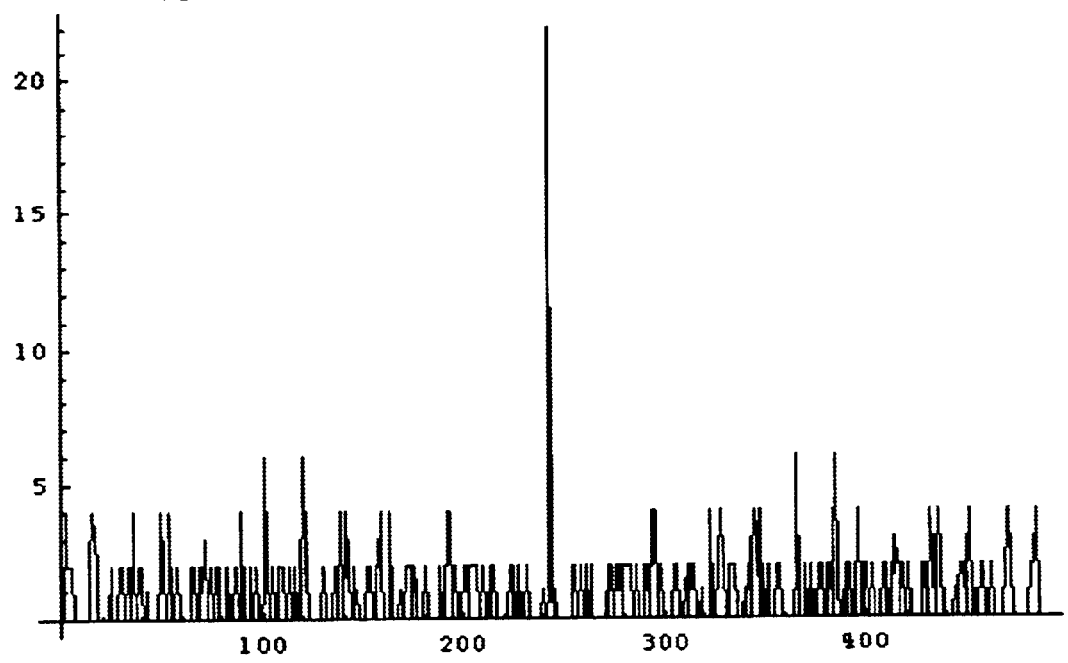
FIG. 6A. Autocorrelation of hyperbolic congruence code, p=23. B: Crosscorrelation of hyperbolic congruence code, p=23. For 11 the variance is 0.66; for p=13, the variance is 1.18056; for p=17, the variance is 0.929688; for p=19, the variance is 0.87037; for p=23, the variance is 0.780992; and for p=29, the variance is 0.966837.
Figure 6:
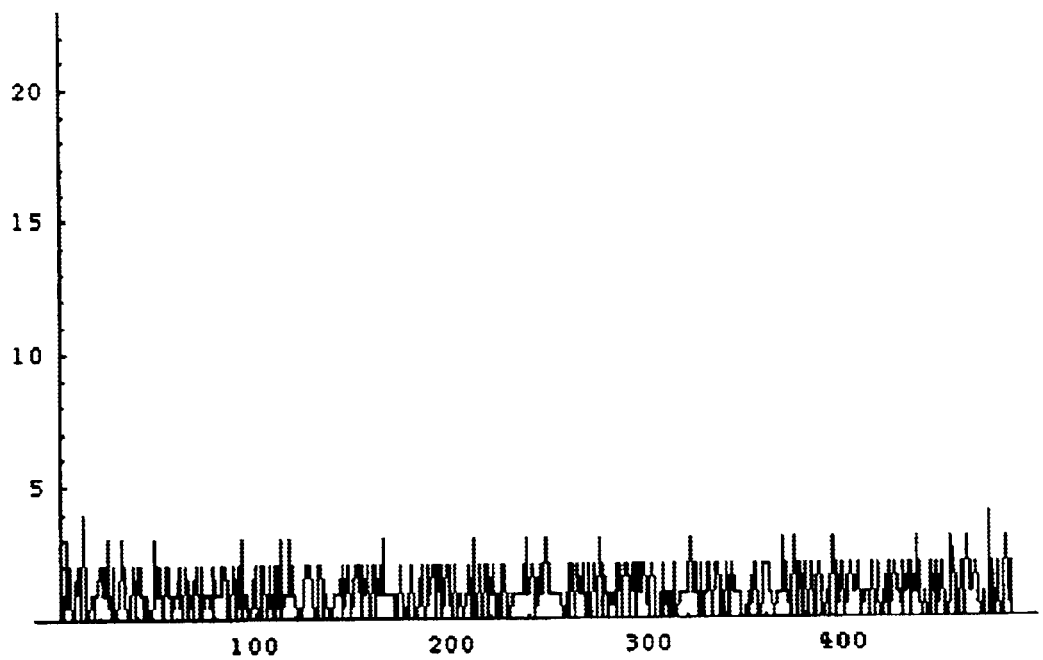
Figure 7:
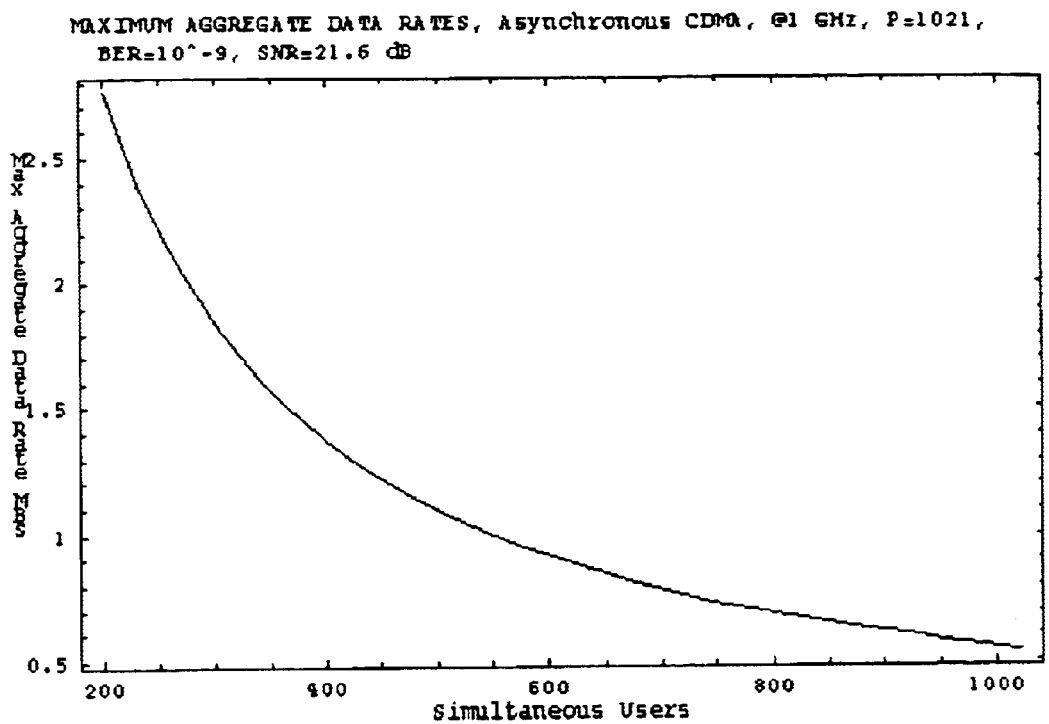
FIG. 7. Maximum Aggregate Data Rate (in MBS) declining as the number of simultaneous users increases in order to maintain a BER of $10^{-9}$. This curve is valid at all code lengths but is shown here over the range 200 to 1000 simultaneous users.
Figure 8:
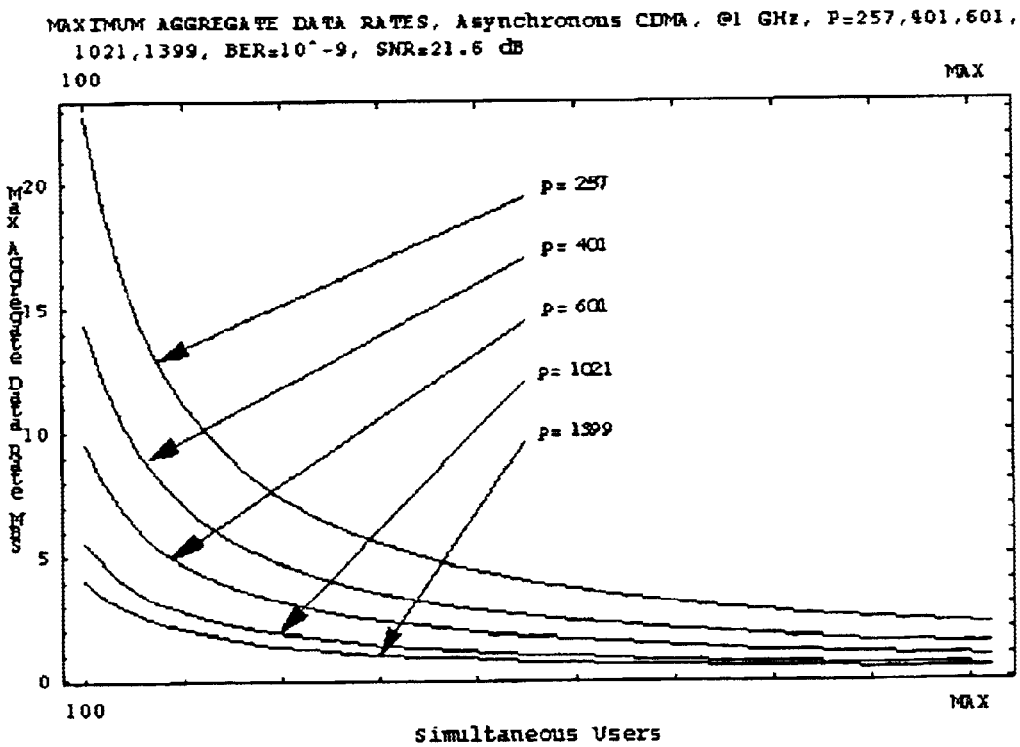
FIG. 8. Maximum Aggregate Data Rate (in MBS) declining as the number of simultaneous users increases in order to maintain a BER of $10^{-9}$. This is the same data as in FIG. 7, but ranging from 100 simultaneous users to the maximum number of users permitted by the code length, i.e., MAX= 257 for p=257 . . . MAX=1399 for p=1399.
Figure 9:
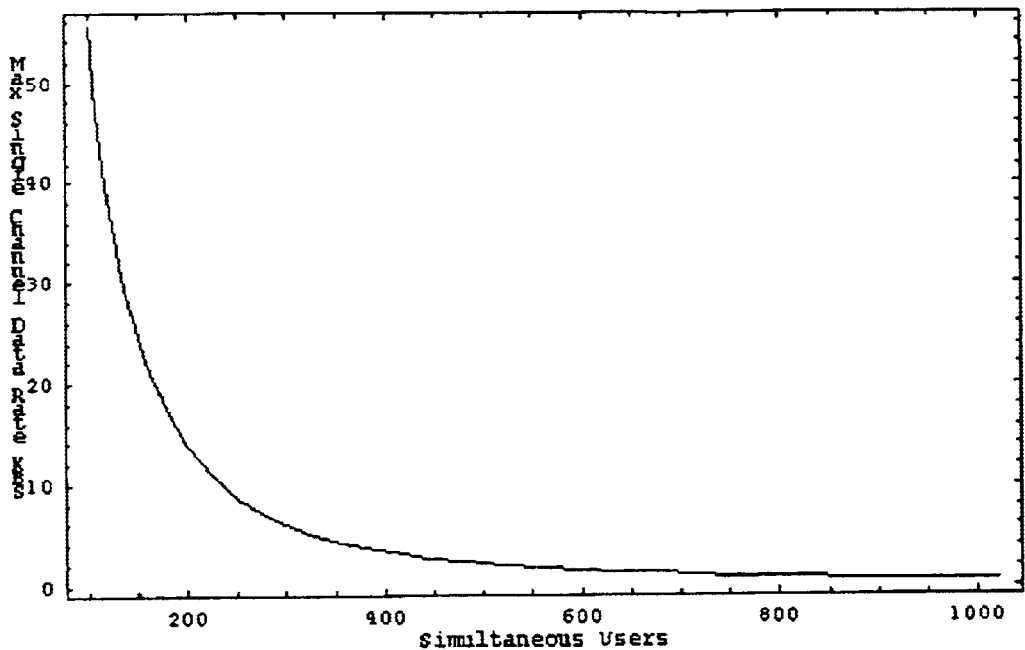
FIG. 9. Maximum Single Channel Data Rate (in KBS) declining as the number of simultaneous users increases in order to maintain a BER of $10^{-9}$. This curve is valid at all code lengths but is shown here over the range 100 to 1000 simultaneous users.
Figure 10:
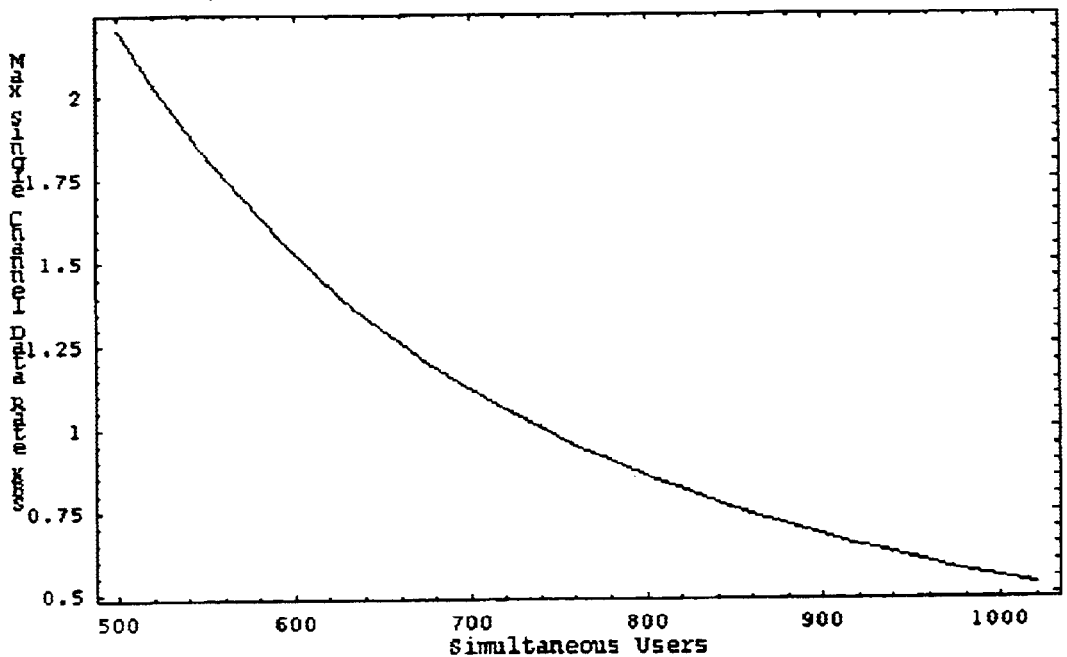
FIG. 10. Maximum Single Channel Data Rate (in KBS) declining as the number of simultaneous users increase in order to maintain a BER of $10^{-9}$. This curve is valid at all code lengths but is shown here over the range 500 to 1000 simultaneous users.
Figure 11:
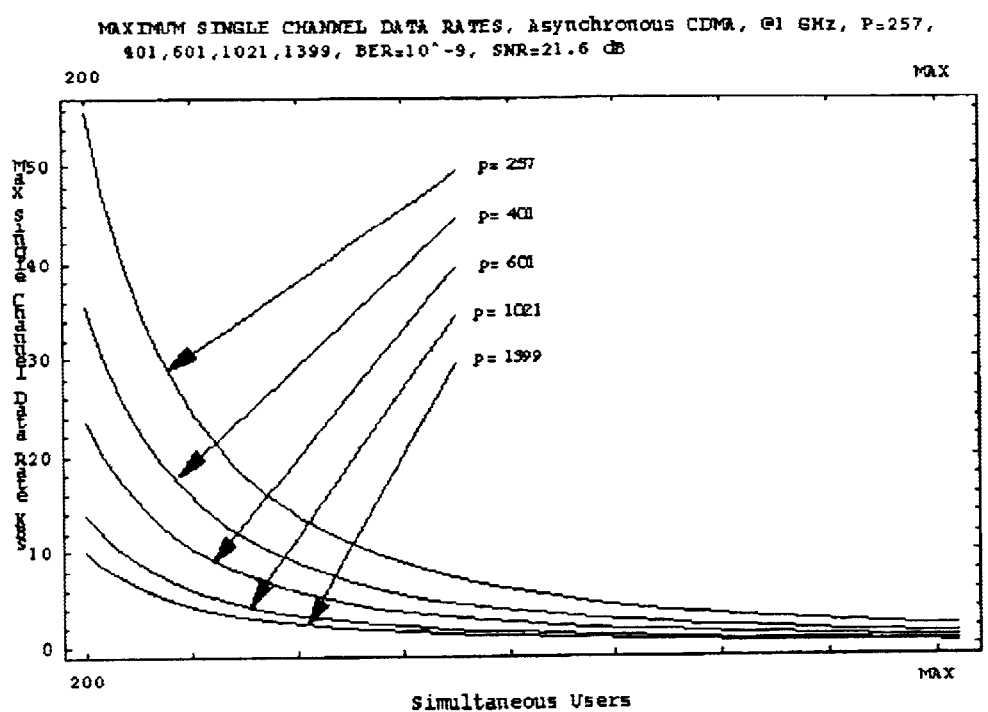
FIG. 11. Maximum Single Channel Data Rate (in KBS) declining as the number of simultaneous users increases in order to maintain a BER of $10^{-9}$. This is the same data as in FIGS. 9 and 10, but ranging from 100 simultaneous users to the maximum number of users permitted by the code length, i.e. MAX=257 for p=257 . . . MAX=1399 for p=1399.
Figure 12:
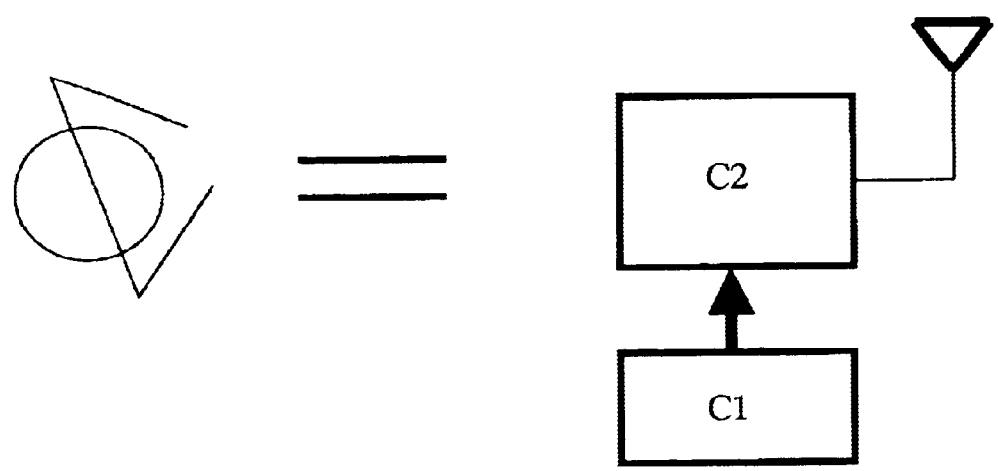
FIG. 12 is a diagrammatic illustration of the satellite communication link on each of the satellites wherein an ultrafast time hopping wireless satellite communication link CL such as 1, 2, 3 . . . N in FIGS. 5A and 5B has a control input for CI causing the individual packets to be short.

In FIG. 5A, satellite 1 transmits to satellites 2, 3, . . . n, utilizing 2 slaved time hopping coding schemes the timing of which is represented by arrow thickness. Satellite 2 receives on one channel formed by one set of orthogonal codes represented by the thick arrow; satellite 3 receives on another channel formed by another set of orthogonal codes represented by thin arrow; and satellite n receivers on both channels. The network is linked by a TDMA protocol.

In FIG. 55, satellites 1 and n both transmit at the same time. Satellite 1 transmits on a channel formed by one set of orthogonal codes represented by thick arrows; simultaneously, satellite n transmits on another channel formed by another set of orthogonal codes represented by thin arrows. Satellites 2 and 3 receive both channels from satellites 1 and n and are able to distinguish information sent on either channel. The network is linked by a CDMA protocol.

There are many possible embodiments of an ultrafast time hopping satellite communications system. The following is an example embodiment which permits multichannel (high data rate) use.

1. Pulse Detector

The signal can be passed through an envelope detector (e.g., log amplifier). The envelope can be processed digitally and if there is a carrier, the carrier can be processed separately and digitally.

2. Oscillator Clock.

This circuit can use, e.g., GaAs MMIC technology, or other semiconductor technology, or crystal-based technology, to convert DC power to a stable oscillating signal. The output signal of the oscillator clock will have sufficient power to drive the data gate circuitry and transmitter amplifier (during transmission of a pulse or packet). The oscillator clock is a crucial subcomponent requiring high accuracy commensurate with the average pulse or packet frequency.

The signal can be generated by a voltage-controlled oscillator phase-locked to a frequency stable reference signal.

3. Pulse Emitter and Antenna Module

During the transmission of an ongoing pulse or packet a sample of the oscillator signal is amplified and transmitted out the antenna. A switching circuit driven by the comparator trigger permits the oscillator clock to drive the transmitter amplifier chain for the duration of the pulse or packet. The transmitter amplifier chain delivers the resulting pulse or packet to the antenna at a power level required by the system.

In the case of RF use, the antennas for both transmit and receive used can either be either of the nonresonant kind or nondispersive TEM horn designs. In either case, printed circuit methods can be used to fabricate the antennas on the circuit boards, as well as other methods of fabrication.

4. Encoders and Decoders (Data Gate Circuitry)

The data gate circuitry is common to both the transmitter and receiver. It can consist of, e.g., very high precision GaAs digital circuitry, or other semiconductor circuitry. The subframe counter is a free running counter driven by the clock oscillator. The output of the counter is compared to the look-up code corresponding to the frame counter.

The digital gate circuitry can be achieved using, e.g., ECL compatible source coupled logic on GAAs, or other semiconductor technology. Gate length and width can be chosen to reduce the parasitic capacitances such that the required loaded gate speeds can be met.

The receiver data gate counters are reset when a transmission is received. A high speed data latch is triggered to capture the output of the pulse or packet detector during the subframes triggered by the code. The output of the data latch contains the transmitted data including error correction which corresponds to the position of the pulse within the subframe.

The transmitter data gate subframe and frame counters are free running. Whenever the subframe counter and codes match the pulse or packet generator is triggered causing a high speed pulse or packet to be transmitted. The pulse or packet position in the subframe corresponds to the data and error correction codes of the least significant bits.

5. Code ASICs

The code generation function can be performed by ASICs in the transmitter and receiver. Once per frame, a pulse or packet is generated by the frame counter ASIC. The code specifies in which subframe the pulse will occur. With the use of more than one code (data rate on demand) the ASIC will provide more than one code to the transmitter and receiver. Alternatively, phase-shift registers can be used to generate the codes.

6. Receiver

The receiver is either a homodyne or heterodyne receiver. The preamplifier feeds a pulse or packet detector, e.g., log amplifier, with e.g., a separate output for envelope and carrier. The remainder of the receiver is similar or complementary to the transmitter. In one embodiment, a high-speed counter gates a data latch when the counter value matches the current main code value. The high-speed counter wraps around at each frame interval. This wrap increments a frame counter, which is used to look up the code commencement in the ASIC. The frame counter wraps around at each superframe interval. The data latch feeds the FEC decoded and optional decoder, which operates at the frame rate.

With the use of multiple codes (data rate on demand) the ASIC, or phase-shift register, or other means of code generation, will provide more than one code to both the receiver and transmitter.

Applications Areas of the Present Invention

All forms of wireless satellite communications—whether transmitting at light or infrared or millimeter wave or microwave or RF energies.

The present invention features:

(a) methods for high data rate inter-satellite communications links—whether transmitting at light or infrared or millimeter wave or microwave or RF energies—where it is desirable to provide communications between satellites at the highest data rate and to relay terrestrially at the highest data rate commensurate with bandwidth restrictions and reliable communications, and more particularly to satellite systems defined in the time-frequency domain which transmit very short pulses or wave packets with a carrier but of a small number of cycles.

(b) methods of ultrafast, ultrashort pulse or packet transmission.

(c) methods for transmitting sequences of such ultrafast, ultrashort pulses or packets.

(d) methods of sequences of pulse or packet (symbol) time interval position modulation according to a coding scheme.

(e) methods of position, phase or frequency modulating such sequences of symbols the temporal position of which is set by a code.

(f) codes stored in matrix form with superframes of received signals matched against the stored codes.

(g) a receiver which synchronizes to a superframe transmission and assigns such symbol transmissions to an appropriate decoders on the basis of code recognition.

(h) multichannel operation which provides high overall data rate.

While the invention has been described in relation to preferred embodiments of the invention, it will be appreciated that other embodiments, adaptations and modifications of the invention will be apparent to those skilled in the art.

What is claimed is:

1. High data rate inter-satellite communications links method for a plurality of satellites comprising providing, for each satellite, an ultrafast time hopping wireless satellite communications link of an allowed bandwidth, in which data is transmitted using individual packets or pulses in a sequence of such packets or pulses, causing said individual packets or pulses to be short in duration so that the individual packets are pulsed and signal energy is spread over said allowed bandwidth substantially simultaneously and instantaneously.

2. The invention defined in claim 1 wherein a time hopping sequential code is used to position the said packets or pulses precisely in sequence thereby providing optimum use of frequency space and also providing noninterfering transmission channels due to the orthogonality of the coding scheme used.

3. The invention defined in claim 1 wherein the ultrashort nature of the individual packets or pulses used permits the time duration of a frame to be divided into very many microintervals of time in which the signal occurs.

4. The invention defined in claim 3 wherein said division into very many microintervals in a frame to permit the availability of as many possible coding schemes as many non-interfering transmission channels.

* * * * *